United States Patent [19]

Parmann

[11] 4,120,521
[45] Oct. 17, 1978

[54] COMBINED MOULD ELEMENT AND SEALING RING

[75] Inventor: Gunnar Parmann, Alvøy, Norway

[73] Assignee: Rieber & Son Plastic-Industri A/S, Bergen, Norway

[21] Appl. No.: 760,958

[22] Filed: Jan. 21, 1977

Related U.S. Application Data

[62] Division of Ser. No. 608,758, Aug. 28, 1975, Pat. No. 4,030,872.

[51] Int. Cl.² ............................................. F16L 55/00
[52] U.S. Cl. .................................... 285/113; 285/345; 285/423
[58] Field of Search .............. 285/110, 230, 231, 13, 285/14, 5, 345, 113, 423; 277/235

[56] References Cited

U.S. PATENT DOCUMENTS

| 219,304 | 9/1879 | Riesel | 277/235 |
|---|---|---|---|
| 2,175,648 | 10/1939 | Roach | 285/110 |
| 2,201,372 | 5/1940 | Miller | 285/105 |
| 2,638,362 | 5/1953 | Sherman et al. | 285/105 X |
| 2,688,500 | 9/1954 | Scott | 285/13 |
| 2,837,353 | 6/1958 | Ashbrook | 285/14 X |
| 2,953,398 | 9/1960 | Haugen et al. | 277/207 A |
| 3,135,520 | 6/1964 | Borah | 277/235 |
| 3,179,445 | 4/1965 | Moretti | 285/231 X |
| 3,377,659 | 4/1968 | Hucks | 425/DIG. 218 |
| 3,520,047 | 7/1970 | Muhlner et al. | 264/92 |
| 3,622,427 | 11/1971 | Kelly | 277/235 |
| 3,728,065 | 4/1973 | Figwer | 425/392 |
| 3,776,682 | 12/1973 | Purmunn | 425/393 |
| 3,804,439 | 4/1974 | Marsh | 285/113 |
| 3,823,216 | 7/1974 | Petzetakis | 285/423 X |
| 3,843,302 | 10/1974 | Petzetakis | 425/393 |
| 3,907,481 | 9/1975 | Heisler | 425/DIG. 218 |

*Primary Examiner*—Dave W. Arola
*Attorney, Agent, or Firm*—Kenyon & Kenyon, Reilly, Carr & Chapin

[57] ABSTRACT

Combined mould element and sealing ring suitable for sealing off a joint between a socket end and an insert end of two cooperating pipes formed from thermoplastic material and for being used as a portion of a body of a mould for both fabricating the socket end of the one pipe and simultaneously inserting the ring in an internal groove in the socket end produced thereby. The main bulk of the sealing ring is composed of elastically yielding material having within its contour at least one zone composed of relatively non-elastic material capable of rendering the zone stable as regards its shape compared with the remainder of the ring. Conveniently, such zones are formed by stiffening rings permanently connected to the main bulk of the sealing ring.

6 Claims, 21 Drawing Figures

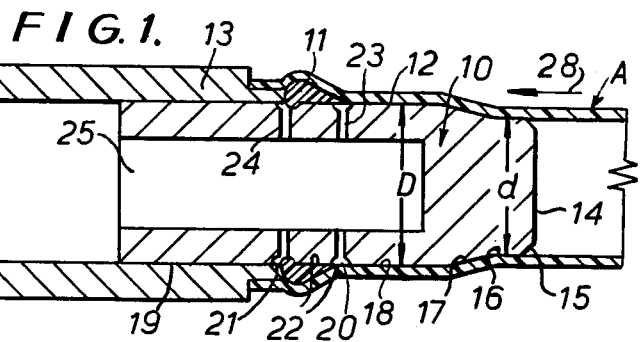
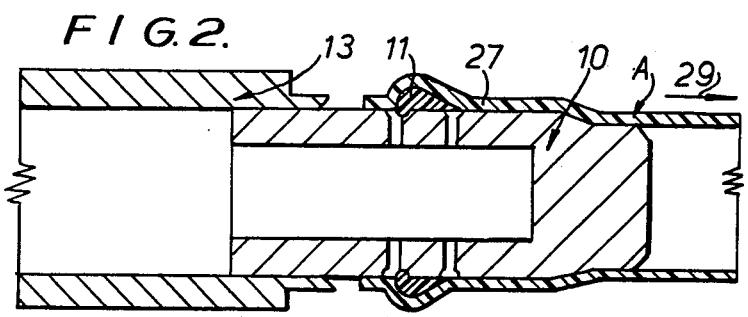

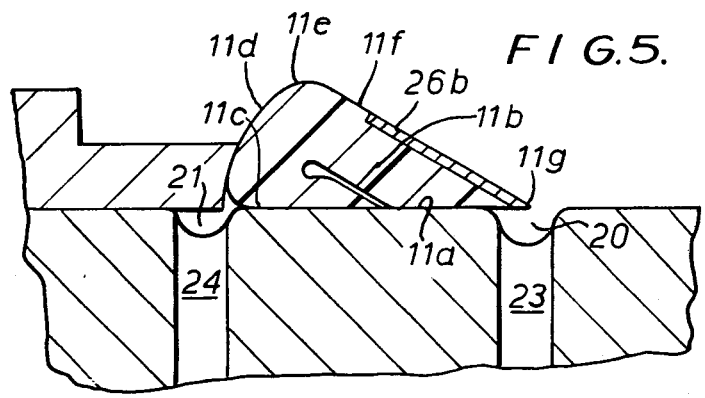
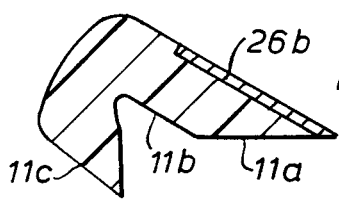
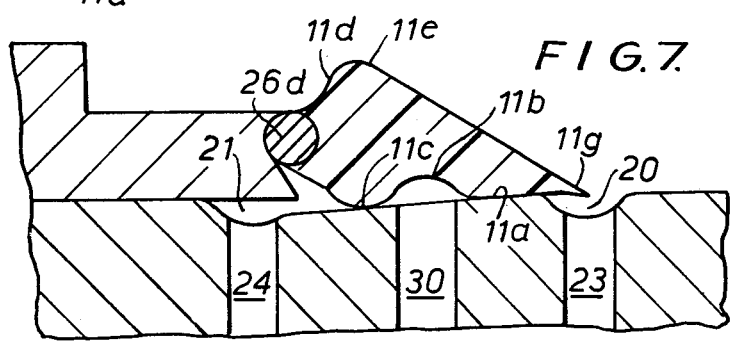
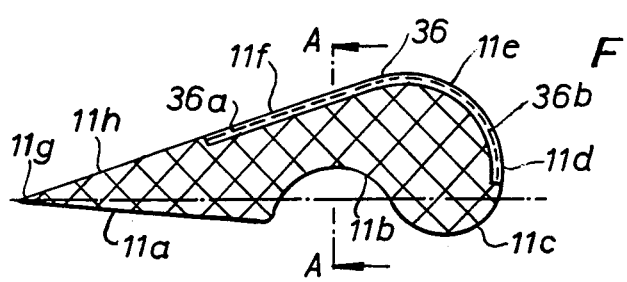
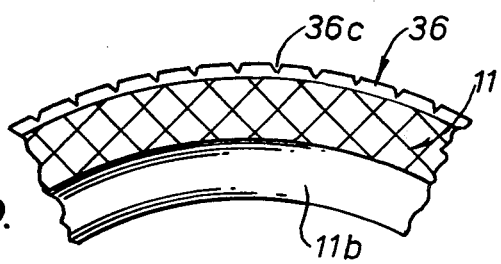

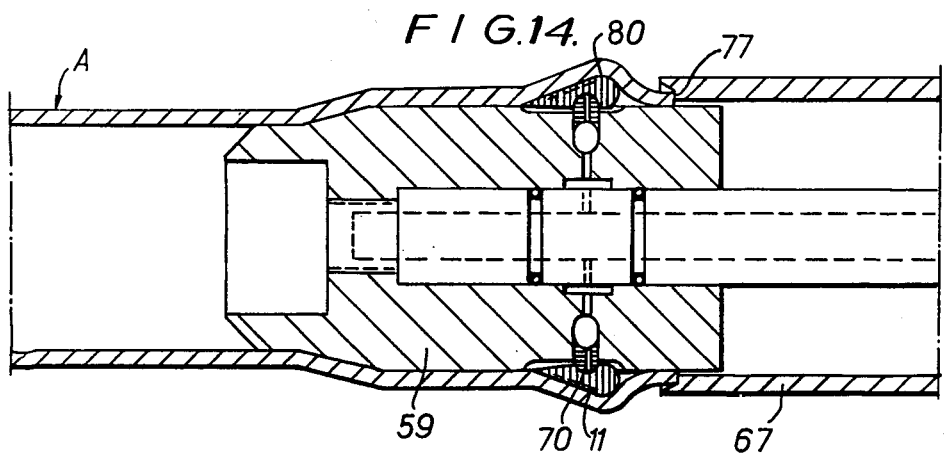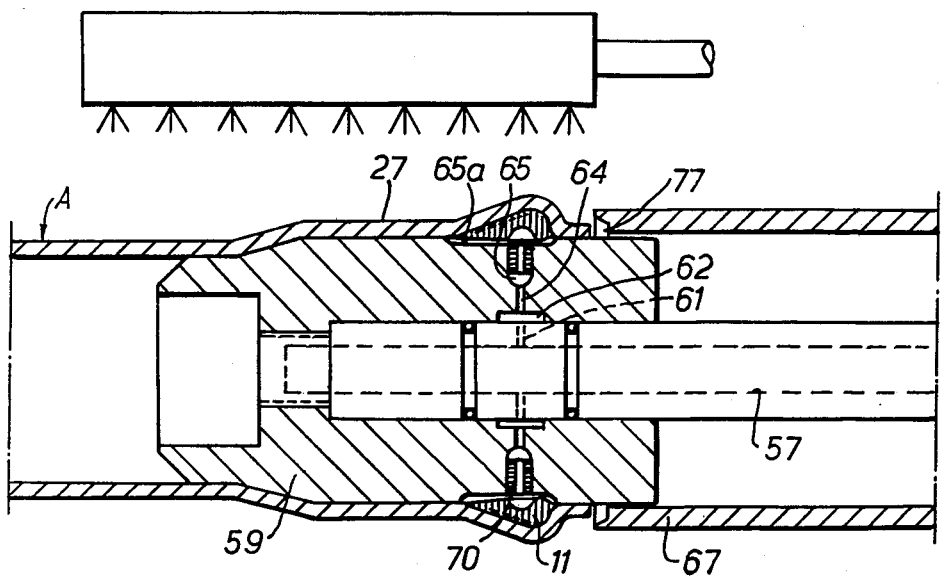

COMBINED MOULD ELEMENT AND SEALING RING

This application is a division of a copending application Ser. No. 608,758, filed Aug. 28, 1975 now U.S. Pat. No 4,030,872.

This invention relates to a pipejoint formed with a combined mould element and sealing ring.

The sealing ring is designed for sealing off a joint between a socket end and an insert and of two cooperating pipes which are formed from thermoplastic material.

The mould element is being used as a portion of a body of a mould for both fabricating said socket end of the one pipe and simultaneously inserting said ring in an internal groove in the socket end produced thereby.

The combined mould element and sealing ring have accordingly two distinct and different purposes, i.e. one as a mould element and one as a sealing ring. In this respect, it will in the following specification be used alternatively the expression "mould element" and the expression "sealing ring", when such expression is deemed to clarify distinct effects in each case. It will, however, be understood that both expressions refer to one and the same construction unit.

It is priorly known processes of using one and the same construction unit as a combined mould element and sealing ring. Reference is being had to U.S. Pat. No. 3,776,682 issued to Parmann and to U.S. Pat. No. 3,520,047 issued to Muhlner.

In U.S. Pat. No. 3,776,682 is described a combined mould element and sealing ring made of rubber. The mould element is supported on a drift by means of a support member which is movable in axial direction on the drift.

In U.S. Pat. No. 3,520,047 is described a sealing ring laterally connected to coherent support rings. One of said support rings is supported on the drift in one case by means of a shoulder on the drift and in another case by means of stopping means which is movable in radial direction on the drift.

In general, many different problems are involved in using a combined mould element and sealing ring, and such problems relate to:

the design and production of such combined mould element and sealing ring, the process involving using the mould element as a portion of the body of a mould and including using the mould element as a sealing ring in the internal groove in the socket and produced thereby, the process of assembling and joining a spigot end and a socket end provided with the sealing ring, and the functioning of the sealing ring in a pipe line comprising joints of spigot and socket ends.

These problems which will be evident from the following specification have hitherto not been looked upon as a whole to a sufficient degree, and many of the problems have mostly been looked upon and solved individually.

One aim of the present invention is to solve as many as possible or most of such problems in a single solution of the present invention.

Design and Production of a Combined Mould Element and Sealing Ring

It is evident that a sealing ring made entirely of elastically yielding material, such as rubber, can be produced with a simple design and produced relatively easily with uncomplicated production equipment. However, such production may involve problems regarding production tolerances. Further, such sealing ring made entirely of elastically yielding material is lacking necessary support effect and may involve problems when being used as a mould element as well as when being used as a sealing ring. In order to solve these problems different solutions have been suggested to compensate for the lack of support effect in sealing rings made of elastically yielding material. One such solution is suggested in U.S. Pat. No. 3,776,682 using a separate support member to support the mould element when producing the socket end. However, the construction is more or less unsupported as a sealing ring. Another solution is suggested in U.S. Pat. No. 3,500,047 using two mould element forming support rings connected to the sealing ring. In this latter embodiment the sealing ring is being left solely as a sealing ring in a space between the mould element forming support rings. It is evident that such combined mould element and sealing ring made of three separate parts complicate the production of the construction unit. Such complicated construction unit involves, however, more or less the same additional support means as the first mentioned construction unit made solely of elastically yielding material. In addition, said complicated construction unit involves further problems regarding production tolerances and varying effects under different conditions in use.

An aim of the present invention is to maintain the effect of the elastically yielding material in the combined mould element and sealing ring and even improve the yielding effect of the mould element and the sealing ring by incorporating the elastic yielding effect therein in a controlled manner.

A further aim is to control the elastic yielding effect by incorporating a local effect in the sealing ring.

Use of the Mould Element

When using the sealing ring as a mould element, the same has to be moved on to a drift, located in desired position thereon, supported accurately thereon and maintained in the desired shape of the mould element during the process of fabricating the socket end on the cooperating drift and mould element.

An aim of the present invention is to incorporate a local support effect in the sealing ring and thus make it possible to allow the mould element to yield in a controlled manner when being moved on and supported on the drift and also to support the mould element accurately on the drift.

A further aim of the present invention is to allow the combined mold element and sealing ring to be used in different producing apparatuses, such as those described in U.S. Pat. Nos. 3,776,682 and 3,520,047 and that described in U.S. Pat. No. 3,793,427 issued to Heisler.

Assembling and Joining Spigot and Socket Ends

During assembling and joining the spigot and socket ends the sealing ring will be compressed in a manner corresponding substantially to the compression which the locked in mould element is exposed to during the withdrawal of the socket and the mold element from the drift.

Due to the close diameter tolerances achieved by shrinking the pipe end directly upon a supported mould element (selaing ring) there is little variation in assembly forces which therefore can be kept low and at a constant rate. A further aim of the present invention is to enable a simple production of sockets which are ready for use without even making lubrication or chamfering of insertion ends necessary.

Function of the Sealing Ring in a Pipe Line

The maintenance of the elastically yielding properties of the sealing ring is above all important when the sealing ring is being used in a pipe line, but it is also of vital importance that such yielding effect is controlled and have sufficient support.

Due to the expansion of the grooved portion of the socket end within the sealing ring is supported, the pipe wall is stretched and thereby causes formation of a relatively thin and weakened pipe wall which may have unsufficient strength for support purposes.

On storage and transportation, the pipes rest as a rule abutting just on the most stretched out parts of the pipe end. Hence, an effective support of these parts will be able to prevent unintended deformations, and even breakages, as a consequence of blows such as readily occur during transportation and handling of the pipes.

Unintentional earth loading, such as traffic load, stones etc. will also be primarily transferred to the most outwardly projecting parts of the socket end, something which can easily lead to deformations and associated leakage in the joints.

An effective support of the annular groove of the socket end will thus contribute to reduce the risk of unintended deformations and the danger of leakages and breakages as well.

In connection with heat strains in the pipes, such as can occur on storage (stacking of the pipes) in hot summer weather, and by use close to sources of heat (steam pipes in the same ditch) etc., a bracing of the annular groove by the use of a stiffened sealing ring will contribute to increase the safety against deformations, shrinkages of the material and resulting leakages etc.

Especially for pipes which are to be utilized with internal excess pressures, the thinner material in the rubber ring groove represents a serious weakness of the pipe.

On using conventional rubber sealing rings, these are pressed together by the internal pressure medium and the pressure forces are transferred to the annular groove by a combination of direct packing pressure and pressure from the pressure medium per se.

Hitherto, in order to reduce the pressure loading against the outwardly stretched and thinned zones of the pipe groove without limiting the permitted internal excess pressure, thermoplastic pressure pipes are provided with a local reinforcement by means of a heavier wall thickness in the stretched area.

The thickening of the pipe wall has been constructed in two main ways which both act to complicate and make expensive the manufacture of the pipes due to increased weight of the pipes and auxiliary production equipment etc. It has been suggested to thicken the pipe material in the socket and during the extrusion process as shown in British Patent Specification 997,551 which additional step involves the need for extra mechanical machinery and the danger that the thickening does not come at the correct location etc. It has also been suggested to apply a reinforcing sleeve outside the pipe end, as shown in the German Pat. No. 1,742,418. The necessity of having two wall thicknesses under control is also undesired from a production point of view. The application of a reinforcing sleeve involves such extra work with the cutting, putting on and securing of the sleeve during the socket operation. As the stretched groove areas often crack by the socketing process, it is very undesirable if these cracks appear between the sleeves and the pipe itself because it cannot be detected.

The automation of the socket operation is complicated by the common modes of production, in addition to production capacity being reduced by the longer heating and cooling times of the thicker pipe ends.

An embodiment of the invention has the further aim of obtaining a controlled sealing due to the packing pressure, as well as direct pressure, from the prssure medium not being transferred to the strongly thinned parts of the annular groove but being, instead, transferred in a controlled manner to the thicker parts of the socket end. In order to prevent a pressure build-up of the internal pressure medium in the gap between the sealing ring and the thinned part of the pipe groove, the aim is a sealing between the sealing ring and socket end in front of this portion and in controlled manner so that the pressure medium cannot be force further into the weakened zones of the annular groove.

In order to ensure that the pressure build-up will not be able to take place between sealing ring and the weakened parts of the annular groove it is an aim that this portion of the sealing element is so designed that possible intruding pressure medium is drained out through gaps in the abutment surface between the sealing ring and the socket outer or upper surface.

An aim of the present invention is to incorporate a local support effect in the sealing ring to secure accurate position of the sealing ring in the socket end regardless the pressure the sealing ring is exposed to from the inside of the pipe or from the outside of the pipe line. Thus, the sealing ring is relieving inner pressure from the weakened grooved socket end and portion and is even allowing the grooved socket end portion to be supported by the sealing ring to compensate for outer loads.

According to the present invention a combined mould element and sealing ring is suitable for sealing off a joint between a socket end and an insert end of two cooperating pipes formed from thermoplastic material and for being used as a portion of a body of a mould for both fabricating the socket end of the one pipe and simultaneously inserting the ring in an internal groove in the socket end produced thereby.

The combined mould element and sealing ring have inner and outer surfaces defining therebetween a unitary body, the main bulk of the body being composed of elastically yielding material.

The body has within its contour at least one zone composed of relatively non-elastic material capable of rendering the zone stable as regards its shape compared with the remainder of the body.

In one aspect of the present invention the zone is formed by a rigid annular ring member permanently connected to the main bulk of said body.

The essentials are that the ring member can be given various shapes and various dispositions in the mould element respectively in the sealing ring so as to provide special desired effects therein.

By incorporating the ring member in the combined mould element and sealing ring, the diameter tolerances of the mould element and the sealing ring are reduced drastically.

It is also possible to control yielding effects in the mould element and sealing ring for sealing purposes and to control support effects in local areas or portions of the mould element as required by different socket producing apparatuses respectively in local areas of the sealing ring as required in the process of assembling and joining spigot and socket ends and in use thereof in pipe lines.

To avoid showing more complicated mandrels than necessary in this application, all the sealing elements are shown in a shape suitable for the direct pushing on of the hot pipe and thereon.

It is obvious, however, that other shapes of the sealing ring cross sections can be made without departing from the spirit of the invention.

It is also to be understood that the scope of the present invention is not to be described herein, but only within accordance to the appended claims when read in light of this disclosure.

Further details of the present invention will be evident from the following specification.

In order that the invention can be more clearly understood, convenient embodiments thereof will now be described, by way of example, with references to the accompanying drawings in which:

FIG. 1 and 2 are cut-off, vertical sections of a mould apparatus of a first embodiment for producing the socket end of the pipe with associated sealing ring, illustrated in two succeeding fabrication steps.

FIG. 3 is a vertical section, on an enlarged scale, of a detail of the connection between an insert end of a first pipe and a socket end of a second pipe with associated sealing ring, FIG. 4, 5 and 7 are vertical sections, on an enlarged scale, of three different embodiments of the sealing ring, FIG. 6 is a vertical section of the sealing ring of FIG. 5 in an unloaded condition, FIG. 8 is a cut-off vertical section of a pipe joint with a sealing ring according to the invention arranged in position between socket end and insert end, FIG. 9 is a vertical section, on an enlarged scale, of the sealing ring of FIG. 8 in an unloaded condition, FIG. 10 is a cut-off vertical section, on an enlarged scale, along the line A—A of FIG. 9, FIG. 11 is a side elevation, partly in vertical section, of an apparatus of a second embodiment for the fabrication of a socket end with a sealing ring according to the invention, FIG. 12 is a vertical section of a portion of FIG. 11 on a larger scale and with the sealing ring in position, FIG. 13–16 illustrate various steps of the fabrication of the socket end, FIG. 17 is a vertical section of a further embodiment of a sealing ring designed for use in the apparatus of FIG. 11, FIG. 18 is a vertical section, on an enlarged scale, of the apparatus of FIG. 11 using a sealing ring of modified embodiment, FIG. 19 is a vertical section of the sealing ring of FIG. 18 in an unloaded condition.

Figure 8:
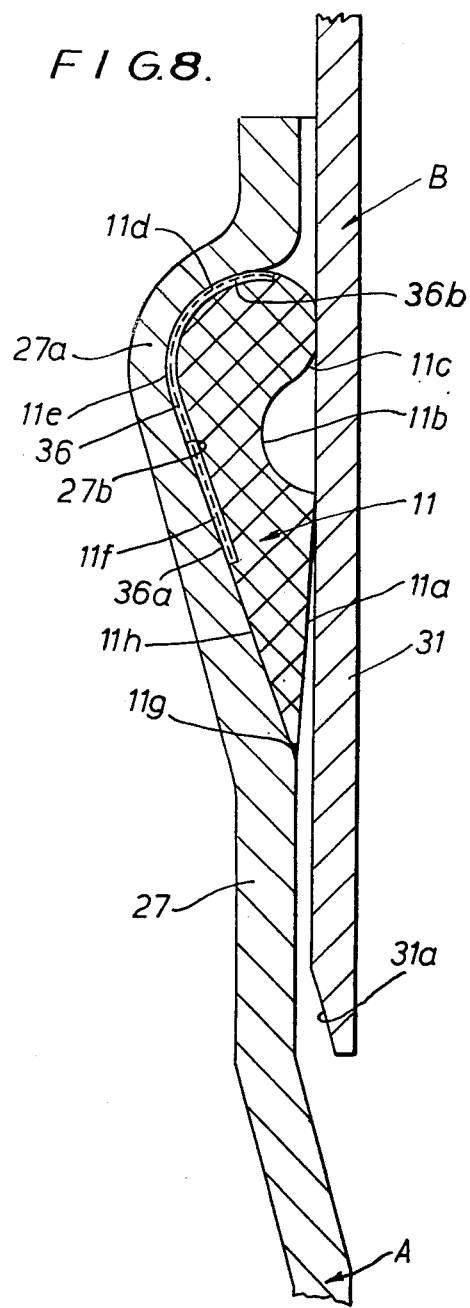

Referring to FIG. 1 and 2, a mould apparatus for the production of a socket end on a first pipe A of thermoplastic material is shown in the form of a) a substantially cylindrical drift 10, and b) a combined mould element and sealing ring 11, which can be readily threaded on and off the main surface 12 of the drift, and c) a support ring 13 which can be displaced axially to and fro on the main surface 12 of the drift. Such a mould apparatus is disclosed further in U.S. Pat. No. 3,776,682 from which document the method of fabricating such a socket end can also be deduced.

The drift 10 is provided with a leading closed end surface 14 which, via a first entering surface-forming conical surface 15, passes over into a first cylindrical drift surface 16 having a diameter d corresponding to the inner diameter of the pipe which is to be threaded in on the drift 10. From the cylindrical surface 16, there extends obliquely outwards a second, shape-yielding conical surface 17 to a subsequent second, substantially cylindrical drift surface 18 having a diameter D corresponding substantially to the inner diameter of the socket end which is to be fabricated on the drift.

The second, substantially cylindrical surface 18 is flush with a third, substantially cylindrical surface 19 which, together with the surface 18, constitutes the main surface 12 of the drift.

Between the surfaces 18 and 19, there exist two peripheral grooves 20 and 21 together with an intermediate, substantially cylindrical surface 22.

The two peripheral grooves 20 and 21 are, as shown in U.S. Pat. No. 3,776,682, connected, via radial bores 23, 24, to a common central bore 25 in the drift and communicated with a source of reduced pressure (not shown further) via the central bore 25.

The peripheral grooves serve to ensure, in a known manner, good air exhaustion around the whole of the periphery of the drift on both sides of the mould element so that the hot pipe end does not get the opportunity to seal the radial bores for air exhaustion. Furthermore, the peripheral grooves serve as a clear limitation of the three surface sections 18, 19 and 22 of the drift so that the individual working of these is simplified as is customary in machine construction.

The surfaces 18, 22 and 19 are designed substantially cylindrical but are adjustable somewhat, all according to the dimensions and tolerances which are desired internally in the finished socket end. Thus the drift surface 18 is designed somewhat conical in producing socket ends which are to provide a force fit between socket and insert ends so that the socket joint can, alternatively, be glued as required for tensile strong joints. The surface 19 of the drift aims to have approximately the same diameter as the insert end which is later to be mounted in the socket end since this reduces the risk of pressing out the sealing element into the annular gap between socket end and insert end by internal excess pressure in the pipes combined with ordinary not reinforced sealing rings.

Drift section 22 serves, in accordance with U.S. Pat. No. 3,776,682, as an abutment for a combined mould element and sealing ring and is adapted, in similarity with the remaining drift surfaces, to the desired internal dimensions in the finally formed and shape-stable socket end.

In comparison gaskets where the sealing ring is to be pressed together against the surface of an insert end, there is utilized, in a known manner, a combined mould element and sealing ring having a minimum diameter somewhat less than the insert end.

Since the mould element is normally disposed on the drift with a weak prestressing of the elastic zones, the drift diameter in the drift section 22 is mostly designed with an external diameter somewhat larger than the corresponding minimum diameter of the mould element.

Peripheral grooves 20 and 21 are specially shallow and have a maximum depth of about 3% of the diameter of the drift.

With the need for extra axial centering of the mould element, one or both of the vacuum grooves can be utilized for positioning of the mould element as is illustrated in the embodiment of FIG. 4.

In pressure pipes, as well as pressureless pipes, the grooves depth in the aforementioned case must in the diameter region between 90 mm and 315 mm be varied between from 1 to 2% of the diameter of the pipe, if this is to be utilized for the reception of the compression portion of the sealing ring or that portion of the sealing ring which has the smallest diameter.

The combined mould element and sealing ring 11 is fabricated from a main bulk of elastic material which, in the illustrated embodiments, consists of rubber. This main bulk is locally supported by a relatively non-elastic material, for example, steel, metal or a rigid plastics material. In the illustrated embodiments, the non-elastic material is in the form of a continuous annular ring member 26 of steel which, together with the rubber, constitutes a unitary member, defining between outer and inner surfaces thereof a body with mainly drop-shaped cross-section.

In FIG. 1 and 2, the application of the unitary sealing ring 11 as an active part (mould element) of the mould apparatus is illustrated. In FIG. 1, the mould element is shown as a conical portion on the mould apparatus for the radial expansion of a socket end 27 of the pipe A. The pushing-on force of the pipe towards the mould element is shown by an arrow 28. On retracting the support ring 13 from the position shown in FIG. 1 to the position shown in FIG. 2, the outer end of the pipe A will conform inwardly against the surface 19 of the drift as is shown in FIG. 2, by means of the vacuum effect which is obtained via the radial bores 24 and the peripheral groove 21. After cooling down of the formed, yet hot socket end, the finished formed, shape-stable socket end is drawn off the drift in the direction of an arrow 29. By means of a bore 30 (FIG. 4 and 7), which opens out in the surface 22 between the vent grooves 20, 21 there can be supplied a lubricant to the under side of the mould element so as to reduce the friction between the drift and the socket end, with associated sealing ring, during withdrawal of the socket end with the sealing ring from the drift. The pipe A thus has a socket end including an internal annular groove and internal cylindrical surfaces on each side of the groove which are of substantially equal diameter. In addition, the ring member has an outer diameter greater than the diameter of these internal cylindrical surfaces.

In general, the mould element will be compressed in a manner corresponding substantially to the compression which the sealing ring is exposed to by the later mounting of a pipe joint on introducing an insert end 31 in the socket end 27. At the same time, the combined mould element and sealing ring will have applied thereon the lubricant which is necessary for the later mounting. In this way, the pipes can be delivered ready for mounting to users which represents a substantial step forward in plumbing. In FIG. 3, the pipes A and B are shown after jointing together. Also, as shown, the sealing ring 11 is disposed in the formed groove of the pipe A wholly between the internal cylindrical surfaces of the pipe A.

The mound element as shown in FIG. 4 is provided with a first conical under or inner surface portion 11a which terminates relatively tightly against the cylindrical surface 22 of the drift. The surface portion 11a passes over into a second, convex inner surface portion 11c. The convex surface portion 11c projects inwards to a level radially within the surface 22 and is received by abutment against the bottom of the one side part of the groove 21 laterally of the bore 24. From the surface portion 11c, the sealing ring extends further upwards in a convex back surface portion 11d which, with its lower part, forms an abutment against a correspondingly shaped surface of the support ring 13. The back surface portion 11d passees further over into a convexly curved outer surface portion 11c, the sealing ring extends further upwards in a convex back surface portion 11d which, with its lower part, forms an abutment against a correspondingly shaped surface of the support ring 13. The back surface portion 11d passes further over into a convexly curved outer surface portion 11e which, in turn, passes over into an obliquely extending, leading surface portion 11f. The surface portion 11f passes substantially in a straight line towards a pointed, leading side edge 11g.

In the embodiment according to FIG. 4, there is introduced a hoop-shaped (circumferentially continuous) steel ring member 26a in the upper part of the mould element, with the outer surface of the ring member coincident with the leading surface portion 11f of the mould element. The ring member 26a is terminated a distance from the outer top or surface portion 11e of the mould element so that this part of the mould element can conform elastically to the peripheral groove which is formed on the inner side of the socket and, more or less independently of the ring member 26a. Furthermore, the ring member 26a is terminated a distance from the leading side edge 11g of the mould element so that there is formed a wedge-shaped elastically yielding part by the leading side edge of the mould element between the surfaces 11a and 11f. In FIG. 4, this part is shown received radially inside the surface 18 or 22, the wedge-shaped portion projecting freeendedly outwards over the groove 20, that is to say without forming an abutment against the bottom of the groove. The wedge-shaped part will, if desired, be able to spring somewhat inwards into the groove 20 during fabrication of the socket end and will, if desired, be able to form a lip seal against the insert end of the pipe B during uniting of the pipes A and B or by excess pressure occurring in the joint between the pipes A and B during use in a pipe line. The ring member 26a will, in the illustrated embodiment, be able to brace the mould element in an effective manner so that the mould element is ensured a position in a shape stable, but nevertheless partially elastic, condition on the drift as well as the sealing ring in the finished fabricated socket end. The ring member 26a will be able to exert a certain stiffening of the combined mould element and sealing ring, not only in the zone which directly supports the ring member 26a, but also in somewhat more remote zones of the mould element and sealing ring and especially within that zone which is defined between the surfaces 11a and 11f. The zones which are defined between the surfaces 11c, 11d, 11e are, on the other hand, unsupported and can be compressed and/or displaced relative to the more stiffened zone between the surfaces 11a and 11f. The zone between the surfaces 11c–11e exerts the particular sealing effect, with compression sealing, by means of the nose part which is formed by the convex surface 11c.

In FIG. 5, there is illustrated a similar construction to that which is illustrated in FIG. 4. An essential difference is that the ring member 26b according to FIG. 5 is extended wholly downwards to the pointed side edge 11g. In this case, the surface 11a is cylindrical and flush with the drift surfaces 18 and 22.

Another essential difference is that the compression seal according to FIG. 4 is replaced by a lip seal. In this connection, a recessed surface portion 11b is defining a lip seal within the drop-shaped body of the mould element and sealing ring as illustrated in FIG. 5. In FIG. 6, is illustrated the sealing ring and its sealing lip in unloaded condition. In FIG. 5, the mould element with its sealing lip is strongly compressed against the cylindrical surface 22 of the drift which is substantially flush with the surfaces 18 and 19.

In FIG. 7, there is illustrated a rather different construction in which a ring member 26d is disposed at the back surface portion 11d of the mould element so that the ring member forms a direct abutment against the support ring 13. The cross-section of the unitary body of the mould element and sealing ring is mainly dropshaped. Between a conical first inner surface portion 11a and a convex second inner surface portion 11c there is a recessed, concave surface portion 11b. The back side portion 11d in this embodiment is, however, concavely curved. In such a case, there can be permitted a significant axial and radial compression of the sealing ring, together with a relatively large movement of the leading edge 11d of the sealing ring, while nevertheless maintaining the shape stability and self-centering ability of the sealing ring. A positioning of the ring member 26d is chosen at a level radially outside the leading edge 11g of the mould element in order, thereby, to ensure an intentional pressing down of the leading edge 11g during the pushing-on of the hot pipe end of the sealing ring.

Essentially, the rigid ring member can be positioned and employed for the reception of the axially acting pushing-on forces which occur on pushing on the hot pipe end onto the mould element. Thus the ring member can be employed for the support of the mould element against an axially displaceable support sleeve, as shown in FIG. 7, for support against point-formed abutment members in the form of pins projecting radially outwards such as utilized in U.S. Pat. No. 3,520,047 or for support against support edges permanently connected to the drift as are used in the same afore-mentined patent specification.

It is apparent that the ring member can be designed in varius other ways and can be positioned in various ways other than those which are shown in the accompanying embodiment in order to be adapted according to existing support means of the mould apparatus or in order to satisfy other demands of the sealing ring. If desired, two or more of the ring members 26a (or 26b), 26d can be combined in one and the same construction and, moreover, such ring members can be connected to each other in a coherent rigid member, for example with separate connecting webs between the parts (not shown).

Referring to FIG. 8, there is shown a first pipe A with a formed socket end 27 and a second pipe 3 with a corresponding insert end 31. The socket end 27 is fabricated as shown and described above and the insert end is chamfered at the very edge with a conical drawing-on edge 31a. As a result of the sealing ring being permanently locked, the conical edge can, if desired, be dispensed with without the danger of pushing in the sealing ring on mounting.

In FIG. 8, there is shown, at 27a, a part of the socket end having a reduced material thickness which has arisen as a consequence of the expansion of the material of the socket end on forming an internal groove 27b for a sealing ring 11. In order to compensate for the weakness in the socket end which said expansion has caused, the sealing ring 11 has been additionally reinforced relative to the sealing ring of the previously described embodiments. In this connection there is utilized a ring member 36 which stretches over the largest part of the extent of the width of the sealing ring, that is to say in the illustrated embodiment over the greatest part of the outer surface portions 11d, 11e, 11f of the sealing ring but with exposure of outer surface portion 11h just by the edge 11g of the sealing ring (see also FIG. 9). The ring member 36 is disposed so that it constitutes the outer surface of the sealing ring over the greater part of the width of the sealing ring. This is done in order to ensure an effective controlled reinforcement of the outer surface of the sealing ring. A similar reinforcement can, however, also be achieved by placing a ring member radially just inside the outer surface of the sealing ring.

There must be particularly emphasized, the advantage which is obtained by designing the ring member 36 as a double curved bracing body, one thereby being able to utilize a relatively thin-walled metal hoop ring member of especially rigid form, which is particulrly favorable for the reception of radial loadings with minimal deformation of the ring member. The ring member, can, however, have different shapes without departing from the spirit of the invention. A conical portion 36a of the ring member 36, as illustrated, is especially suitable for forming an internal support for the socket end 27 in the weakened part 27a which surrounds the groove 27b and for absorbing the internal pressure loadings which are exerted in a radial direction outwardly against the sealing ring without loading the weakened part 27a of the socket end. The convexly curved portion 36b of the ring member 36 will, in addition, form an effective support for the sealing ring and prevent it from being pressed into the annular gap between spigot end and socket end by internal excess pressure in the pipe line.

By bracing the outer surface of the sealing ring at 11d -11f with the ring member, one can, by utilizing normal steel plate or similar material with an unworked surface, readily adjust the top surface with sufficient nonuniformity to ensure a draining-off of the gap between the sealing ring and the sealing ring and the groove of the socket end in the fabricated socket end. In order to ensure such a draining effect, the outer surface of the ring member (See FIG. 10) or the outer surface (i.e. the bulk material) of the sealing ring is provided with relatively narrow and shallow, V-shaped grooves 36c which extend transversely of the ring member, i.e. longitudinally of the socket end. Even if the ring member is included in the mould surface of the combined mould and sealing ring, the filling of the whole of the gap opening can be avoided by making the grooves sufficiently narrow. (The grooves are shown somewhat overly large in the drawing).

By draining off the gap which is formed on the upper side of the ring member, there is obtained an effective sealing on that portion of the sealing ring which is without reinforcement, that is to say at that part which boarders on the surface 11h and which forms an abutment against the transition to the groove 27b. The pressure medium which acts against the inner side of the sealing ring, tht is to say against the surface 11a, will normally press the surface 11h outwards into sealing abutment with the groove 27b but if, nevertheless, pressure medium should creep further outwards along the gap between the surface 11h and the groove 27b, such pressure medium will be able to be discharged in the gap which is formed between the groove 27b and the surfaces 11f, 11e, 11d. It has been found that a particularly effective sealing can be obtained at the surface 11h just as a result of the draining off which occurs behind the surface 11h, since one obtains a pressure medium-dependent lip sealing-like packing at edge 11g of the sealing ring.

If the pressure medium is pressed outwards into the hollow space which is formed by the cavity 11b on the inner side of the sealing ring, transmittal of the pressure to the socket end via the sealing ring can be prevented since the sealing ring has the ring member arranged radially outside the cavity 11b. The pressure increase in said hollow space will only increase the effect of the lip seal at the edge 11g and at the surface 11h without acting on the weakened part 27a of the socket end. The sealing portion which is located at the opposite, outwardly directed edge of the sealing ring and which is formed within the surface 11c, is essentially stiffened by the radially and inwardly directed edge part 36b of the ring member 36 without this part reducing the elastic sealing properties of the sealing ring at the abutment surface of the sealing portion against the insert end of the internal pipe. If desired, the sealing surface 11c can possibly be designed with an extra sealing lip which is pressed down against the insert end 31 by internal excess pressure in the pipe.

Figure 11:
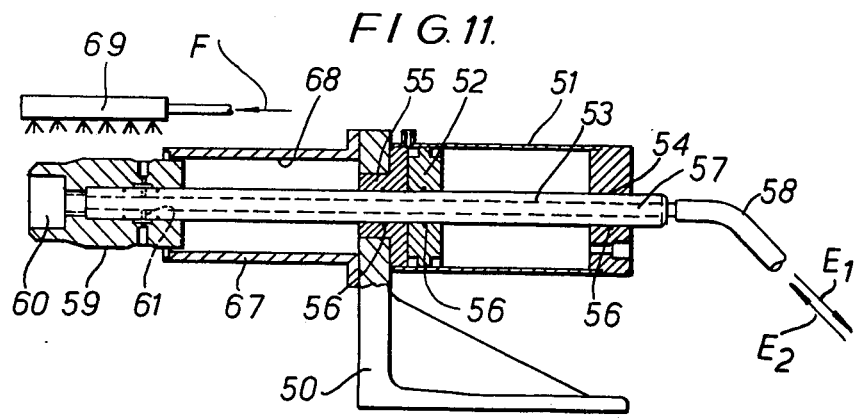
Figure 16:
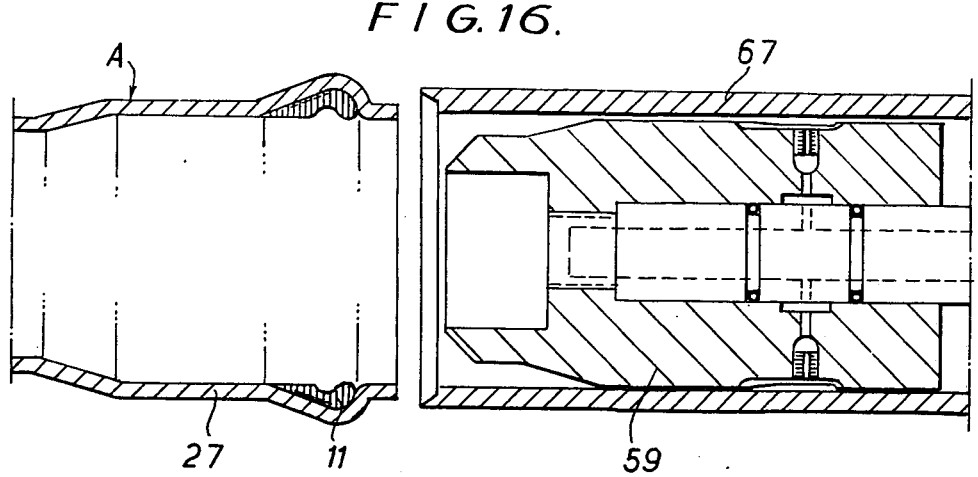

In FIG. 11, a second embodiment of an apparatus for fabrication of the socket end of a thermoplastic pipe is shown. There is shown a support member 50 which supports a compressed air cylinder 51 having an axially moveable piston 52 fixed to a piston rod 53. The piston rod 53 extends right through the cylinder 51 through guides 54 and 55 at opposite ends of the cylinder. At 56, there are shown packing ring for sealing off the piston rod against the guides 54,55 and against the piston 52. The piston rod 53 is pipe-shaped and a bore 57 of piston rod 53 is terminated at the one end by a flexible pipe 58 which, in a manner not shown, places the bore, via a control valve, in communication with a souce of pressure medium (indicated by the arrow $E_1$) and with a vacuum source (indicated by the arrow $E_2$). The opposite end of the rod 53 supports a drift 59 having a head portion 60 which closes the bore 57 of the rod at the end. A distance within the end of the rod, there extend radial bores 61 outwardly towards an internal annular groove 62 in an axial bore 63 in the drift and from the annular groove 62, there extend radial bores 64 outwardly to an outer annular groove 65 in the drift. The rod 53 is received in the axial bore 63 and is sealed against the drift by means of packing rings 66 disposed on opposite sides of the bores 61 outside the annular groove 62. To the support member 50, there is fixed an outer support member 67 having an internal bore 68 which surrounds the drift with a free fit at the inner end of the drift in FIG. 11, that is to say in the longest outwardly displaced position of the drift, and surrounds the whole of the drift in the longest inwardly displaced position of the drift (FIG. 16). Just above the drift 59, there is arranged a water flushing device 69 which is fed water as shown by the arrow F.

Figure 12:
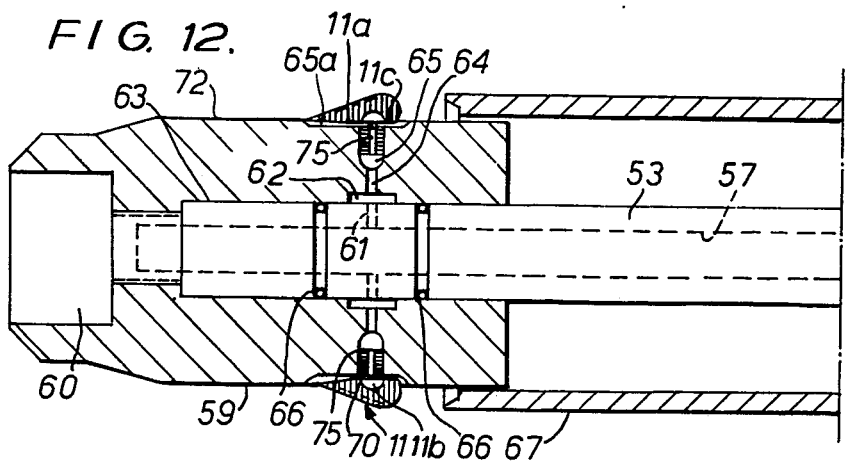
Figure 13:
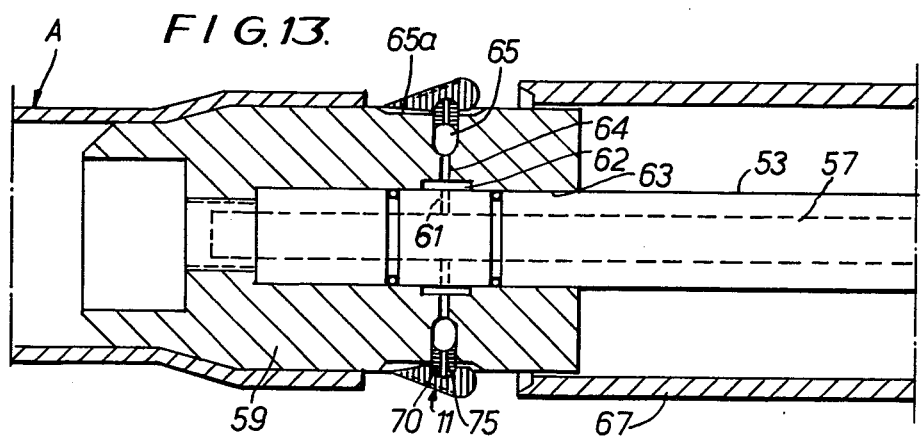

In FIG. 12, there is shown an annular locking device 70 of elastically yielding material, such as rubber, received in the annular groove 65. In the inactive position, as shown in FIG. 13, the locking device is drawn radially within the bottom of a relatively shallow, broad outer part 65a of the annular groove 65.

The locking device 70 is designed to be able to shut off the mould element 11 at a definite position on the drift 59. This position is made secure by means of the annular groove part 65a which forms a depression in the main surface 72 of the drift. It should be evident from FIG. 12, that the ring 11 can be displaced relatively easily along the surface 72 of the drift with a supporting abutment between the surface of the drift and the inner surface portions 11a, 11b and 11c of the mould element 11. In the position which is shown in FIG. 12, where the mould element 11 is unloaded, the inner surface portions 11a, 11c project only inwards into the groove part 65a without touching the bottom of the groove part.

In the illustrated embodiment, there is utilized a locking device 70 in the form of an elastic rubber ring of rectangular cross-section. In the rubber ring there are formed a series, for example 4–6, of radial bores 75 of relatively small diameter.

After the mould element is placed in position in the groove part 65a on the drift, as is shown in FIG. 12, pressure medium is fed to the under side of the locking device 70 from the source $E_1$ via bore 57 of the piston rod 53, radial bores 61 and via inner annular groove 62 of the drift, and radial bores 64 to the bottom of the annular groove 65. The elastic locking will hereby be extended radially outwards through the groove 65a to engage with a recessed concave inner surface portion 11b of the mould element. Only small quantities of pressure medium lead outwards through the bores 75 of the locking device, and immediately the rubber ring forms an abutment against the surface portion 11b, the bores 75 are covered and shut off by means of the sealing ring. By means of the pressure medium, there is ensured an effective abutment between locking device and sealing ring.

In FIG. 13, there is shown a pipe A of thermoplastic material the illustrated end of which is heated to a suitable plastic condition so that it can be shaped over the drift 59 as is shown to the left of FIG. 13 and thereafter can be shaped over the mould element 11, such is illustrated in FIG. 14. During the pushing-on, the hot pipe end is moved axially on the drift until it thrusts against a stop 77 on the outer support member 67.

After the pipe end is shaped with socket end 27, the pressure against the locking device 70 is discharged so that the latter falls back into the position which is shown in FIG. 15. Afterwards the locking device is placed under vacuum from the source $E_2$ via the mentioned passage 57, 61, 62, 65, 65, the vacuum transmitting itself via the bores 75 of the locking device to the groove part 65a and providing for the drawing of the outer end of the socket end, tightly around the sealing device and downwards against the drift. It is evident from FIG. 15, that the outer end of the socket end when socked onto the drift is drawn away from the abutment against the stop 77 in the outer support member 67.

After the vacuum is closed off and the socket end is cooled down, it is pushed off the drift 39 by drawing the drift into the outer support member 67, as is shown in FIG. 16.

Figure 17:
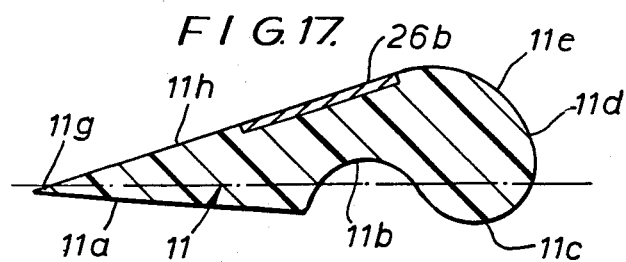

The mould element to be used in the apparatus illustrated in FIGS. 11 to 16 is of the type illustrated in FIG. 9. The mould element can, however, be modified as illustrated in FIG. 17. The main modification is the shape of the ring member which is similar to the ring member 26e illustrated in FIG. 3 and 4.

In the embodiments illustrated in FIG. 9 and 17, the recessed concave surface portion 11b is localized just below a part of the ring member 26b so that the radial force which is exerted against the mould element from the locking device 70 is intercepted and relieved in the bracing means, without essentially affecting the main bulk of the mould element. The ring member is arranged reckoned in an axial direction, between the inner surface portion 11b and the inner surface portion 11a, and is further arranged radially just outside the concave inner surface portion 11b so that the pushing-on force from the hot pipe end against the mould element can be transferred from the ring member axially to the locking device 70 with radial support of the ring member against the locking device.

Figure 18:
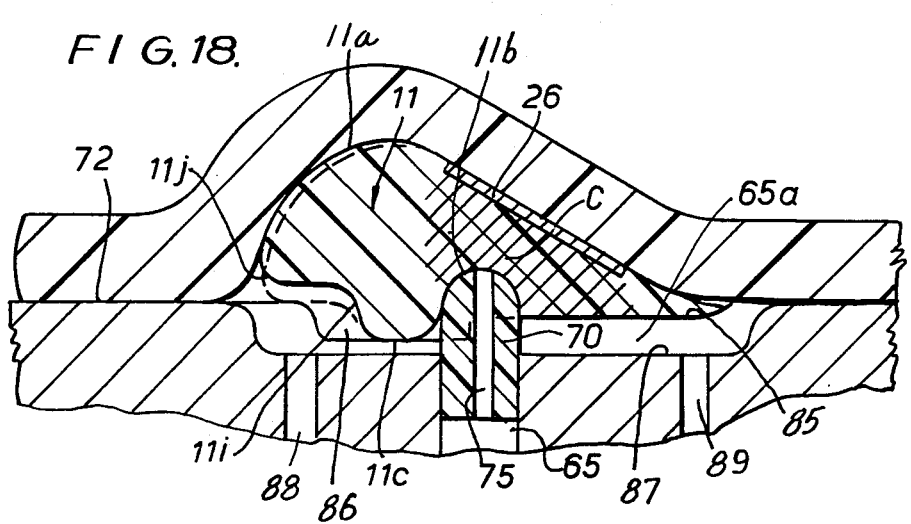

In FIG. 18, there is shown a modified construction of the drift illustrated in FIGS. 11 to 16. Two parallel annular grooves 85 and 86 of mutually different diameter are arranged on the drift surface to support respectively the cylindrical inner surface portion 11a and the convex inner surface portion 11c of the mould element 11. Underneath the annular grooves 85, 86 extend a series of parallel axial grooves 87. The grooves 87 extend axially beyond the grooves 85, 86 but have breadth and height dimensions preventing the mould element from closing the passages formed by said grooves 87. The grooves 87 communicate with a vacuum source (indicated by the arrow $E_2$ in FIG. 11) via bores 88,89 and open radially into the grooves 85, 86 and in addition open radially towards the inner surface of the pipe and laterally of the mould element.

As illustrated in FIG. 18, the convex inner surface portion 11c of the mould element is modified in that an additional concave inner surface portion 11i and an additional convex back surface portion 11j extend from said inner convex surface portion 11c to said convex back surface portion 11d. By means of chained lines is illustrated a compression of the rear part of the mould element as provided by contraction of forces developed by the heated pipe end upon cooling thereof. It is evident from FIG. 18 that the rear part of the mould element is rather unsupported and accordingly can be compressed regardless of the ring member 26 which is supporting the remainder of the mould element.

Advantages in the Socket Fabrication as a Result of the Stiffened or Braced Mould Element and Sealing Ring (a) Fixed locking of the sealing ring on the socket drift can, by virtue of the rigid ring member, be effected especially simply due to the fact that radially moveable locking devices can be pressed out against the mould element and can secure the latter with the reinforcement as a stop.

(b) The forces which press the locking device (a continuous circular rubber ring, steel spikes or the like) radially outwards can be permitted to vary within wide limits without affecting the socket operation. The forces which act on the mould element radially outwards are received by the reinforcement without the latter being deformed in such a way that the hot plastic pipe is prevented from being pushed over the latter.

(c) In particular, the entry of the hot pipe end over the sealing ring will not be hindered since the entering edge of the mould element for the hot pipe end is, by virtue of the rigid reinforcement, not allowed to be lifted up over the drift surface and does not cause "fishing" with the pipe end.

(d) The locking devices do not participate in the moulding of the pipe end and can, therefore, be constructed without strong demands on dimensions and tolerances. The locking devices do not need either to support the mould element around the whole periphery as a consequence of the reinforcement, but can be divided up into three or more independent elements.

(e) Since the reinforced mould element makes it possible with a radial clamping of the latter, there is achieved a self-locking effect of the locking devices for securing the mould element in an axially non-displaceable manner on the drift against the pushing-on force of the hot pipe end.

(f) The radial fixed locking of the mould-element such as is made possible by the reinforcement of the latter, leads to an especially simple and correspondingly cheap and dependable socket-producing apparatus.

The apparatus to be used with the combined mould element and sealing ring of the present invention has simple movements and no complicated parts.

(g) When the hot pipe end is pushed over the reinforced sealing ring, the locking device is relieved and the pipe end is moulded around the reinforced mould element by means of vacuum and inherent elastic forces.

As a consequence of the reinforcement of the mould element the mould element is maintained in its desired form and the hot pipe end is contracted about the mould element so that there is obtained optimum shaping of and tolerances in the socket end.

Figure 19:
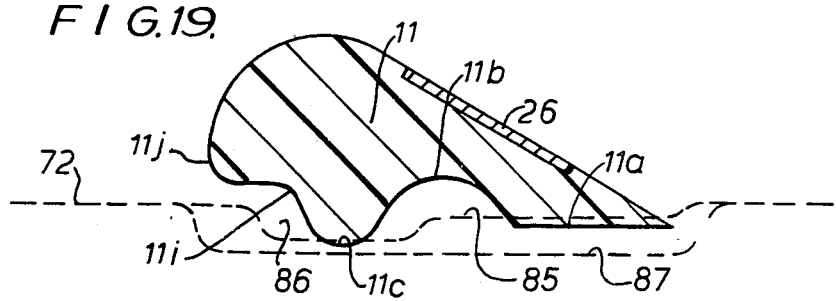

In FIG. 19 is illustrated the mould element 11 in unloaded position and the drift surface 72 and the grooves 85, 86, 87 are indicated in chained lines. It should be evident therefrom that the inner diameter of the cylindrical inner surface portion 11a of the mould element is smaller than the diameter of the grooves 85 and to a greater extent greater than the diameter of the grooves 87, whereas the inner diameter of the convex inner surface portion 11c is smaller than the diameter of said inner surface portion 11a and the inner diameter of the groove 86 but greater than the diameter of the grooves 87.

With the mould element in position on the drift (FIG. 18) the locking device 70 is being pressed by pressure medium (from the pressure medium source $E_1$ (as shown in FIG. 11) radially outwards against the concave inner surface portion 11b as explained above with reference to FIGS. 11 to 16, whereas the inner surface portions 11a and 11c are being pressed against the bottom of their respective groove 85 and 86. The strongly compressed portions of the mould element is illustrated by cross-hatching as shown at C in FIG. 18. It is possible to control such strongly compressed portions of the mould element and prevent that the socket end is loaded unduly by means of the rigid ring member 26 which is located radially outside said strongly compressed portions. It is thus possible to position the mould element accurately and securely on the drift by means of the clamping effect provided between the ring member 26 of the mould element and the groove 85 of the drift and the clamping effect provided between the ring member 26 and the locking device.

Figure 20:
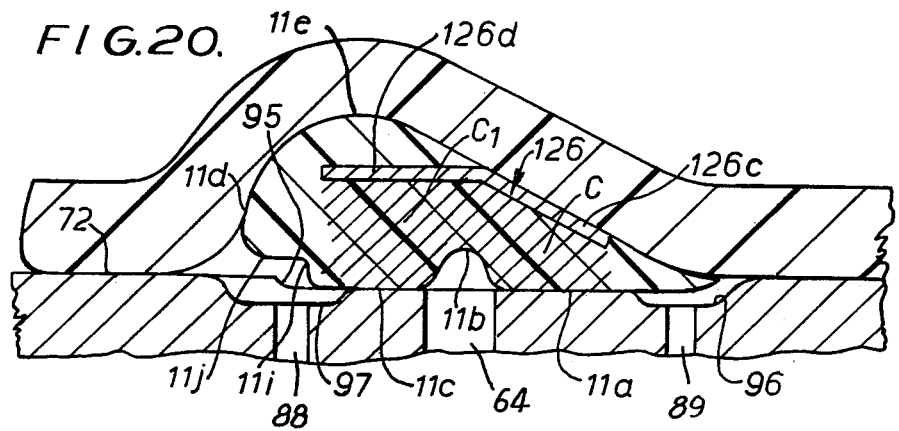
FIG. 20 is a vertical section, on an enlarged scale, of a modified apparatus of FIG. 11 using a sealing ring of further modified embodiment.

In the embodiment of FIG. 20, there is illustrated a single groove 95 to support the cylindrical inner surface portion 11a and the convex inner surface portion 11c of the mould element. Two annular grooves 96, 97 are located laterally of the groove 95 one at each side thereof and communicate separately with the bores 88, 89. The mould element is provided with a ring member 126. The ring member 126 consists of a first conical portion 126c corresponding to the ring member 26 of FIG. 18 and 19 and a second portion 126d extending from said conical portion 126c towards the rear portion of the mould element. This second portion 126d is in a preferred embodiment illustrated in cylindrical shape but it is evident that various other shapes will also be possible without departing from the spirit of the present invention.

Figure 21:
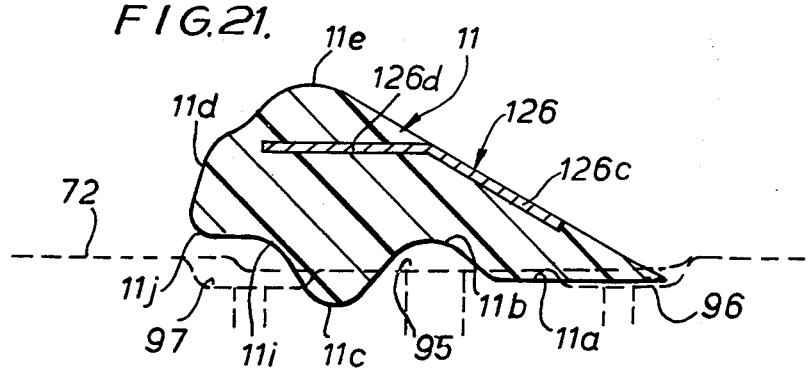
FIG. 21 is a vertical section of the sealing ring of FIG. 20 in an unloaded condition.

By means of the second ring member portion 126d, the strongly compressed portion C of the mould element cooperates with an additional strongly compressed portion $C_1$ of the mould element radially inside the second ring member portion 126d. This enables an additional support and additional friction of the mould element provided by the compressed mould element portion defined by the surface portion 11c. Again this makes it possible to dispense with the locking device 70 as used in the embodiment of FIG. 18 and 19. The groove 65 which communicates with a vacuum source (indicated by the arrow $E_2$ in FIG. 11), communicates directly with the concave inner surface portion 11b of the mould element and provides a vacuum locking means for positioning and locking the mould element in the groove 95. It is however, evident that the mould element 11 of FIG. 20 and 21 also can be used in the apparatus of FIG. 1 and 2. In such a case the outer surface diameter of the support ring 13 more or less corresponds to the outer surface diameter of the ring member portion 126d. In both cases the ring member portion 126d is acting as a partition wall between the strongly compressed portion $C_1$ of the mould element and the radially outer portion of the mould element defined between the convex outer surface portion 11e and said ring member portion 126d.

As the hot pipe end is pushed over the mould element, vacuum is applied through the bores 88 and 89. The hot pipe end is thus pressed against the outer contours of the mould element by the atmospheric pressure, thus compressing the radially outer portion of the mould element defined between the convex outer surface portion 11e and said ring member portion 126d.

As the hot pipe end is cooled off by means of water spraying, the pipe end contracts and a tight seal between the groove portion of the pipe and the sealing ring (mould element) is achieved. By means of the ring member portion 126d the tight sealing against the groove is maintained even after the socket is released from the drift, and the diameter tolerances in the sealing ring portion 11c is not being influenced, thus ensuring very close diameter tolerances.

The very close tolerance achieved in the production of the reinforced mould element (sealing ring) combined with the very close diameter tolerances of the mould element after it is locked into the groove in a socket, makes it possible to reduce the volume of elastic body in the mould element. The reduced elastic body diminishes the stretching and thinning of the pipe material in the groove area which increases the strength of this pipe section.

The tight fit of the sealing ring (mould element) also prevents impurities from entering the groove during transport and storage.

What is claimed is:

1. A pipe joint comprising
   a first pipe of thermoplastic material having a socket end including an internal annular groove and internal cylindrical surfaces on each side of said groove of substantially equal diameter;
   a second pipe having an insert end within said socket end; and
   a sealing ring disposed in said groove wholly between said cylindrical surfaces concentrically between and sealingly engaging said insert end and said socket end, said ring being a unitary ring composed of a body of elastically yielding material and a rigid circumferentially continuous annular ring member within said body, said ring member having an outer diameter greater than said diameter of said internal cylindrical surfaces.

2. A pipe joint as set forth in claim 1 wherein said sealing ring has a leading surface portion and said ring member has a conical surface coincident with a surface of said leading surface portion of said sealing ring.

3. A pipe joint as set forth in claim 2 wherein said conical surface includes longitudinal draining passage between said surface and the opposing surface of said socket end.

4. A pipe joint as set forth in claim 1 wherein said ring member has a partition wall portion embedded in said body for individual support of two mutually opposed sealing portions of said body disposed in sealing engagement with a respective pipe.

5. A pipe joint as set forth in claim 1 wherein said annular ring member is permanently connected to said body.

6. A pipe joint as set forth in claim 5 wherein said sealing ring has a leading surface portion and said ring member has a conical surface coincident with a surface of said leading surface portion of said sealing ring.

* * * * *

UNITED STATES PATENT AND TRADEMARK OFFICE
CERTIFICATE OF CORRECTION

PATENT NO. : 4,120,521
DATED : October 17, 1978
INVENTOR(S) : Gunnar Parmann

It is certified that error appears in the above-identified patent and that said Letters Patent are hereby corrected as shown below:

```
Column 2, line 15, change "3,500,047" to --3,520,047--
Column 2, line 36, after "local" insert --support--
Column 2, line 67, change "(selaing ring)" to --(sealing ring)--
Column 3, line 13, change "within" to --wherein--

Column 4, line 5, change "sleeves" to --sleeve--
Column 4, line 12, change "prssure" to --pressure--
Column 4, line 21, change "force" to --forced--
Column 8, line 3, change "mound" to --mould--
Column 8, line 16, change "passees" to --passes-
Column 9, line 52 change "afore-mentined" to -- afore-mentioned --
Column 9, line 55 change "varius" to --various--
Column 10, line 34, change "particulrly" to --particularly--

Column 11, line 8, change "tht" to --that--
Column 11, line 53, change "souce" to --source--
Column 13, line 64 change "device" to --devices--
Column 14, line 44, change "grooves" to --groove--
column 15, line 34, after "is" insert --,--
Column 16, line 6, change "tolerance" to --tolerances--
```

Signed and Sealed this

Twenty-second Day of May 1979

[SEAL]

Attest:

RUTH C. MASON
Attesting Officer

DONALD W. BANNER
Commissioner of Patents and Trademarks